(12) United States Patent
Sarkisian et al.

(10) Patent No.: US 7,677,714 B2
(45) Date of Patent: Mar. 16, 2010

(54) INKJET INKS PROVIDING IMPROVED WET SMUDGE ON POROUS PRINT MEDIA

(75) Inventors: George Sarkisian, San Diego, CA (US); Xiaohe Chen, San Diego, CA (US); Keshava A. Prasad, San Marcos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 554 days.

(21) Appl. No.: 11/070,897

(22) Filed: Mar. 2, 2005

(65) Prior Publication Data

US 2006/0071992 A1 Apr. 6, 2006

Related U.S. Application Data

(60) Provisional application No. 60/615,129, filed on Oct. 1, 2004.

(51) Int. Cl.
*G01D 11/00* (2006.01)

(52) U.S. Cl. .............................. 347/100; 347/95; 347/96

(58) Field of Classification Search ................ 347/100, 347/95, 96, 101; 106/31.6, 31.13, 31.27; 523/160
See application file for complete search history.

(56) References Cited

U.S. PATENT DOCUMENTS

| | | | |
|---|---|---|---|
| 4,996,252 A | 2/1991 | Phan et al. | |
| 5,958,998 A | 9/1999 | Foucher et al. | |
| 6,214,099 B1 * | 4/2001 | Ueda et al. | 106/31.57 |
| 6,432,194 B2 | 8/2002 | Johnson et al. | |
| 6,541,590 B1 | 4/2003 | Johnson et al. | |
| 6,646,024 B2 | 11/2003 | Beach et al. | |
| 6,676,736 B2 | 1/2004 | Nakano et al. | |
| 2001/0023266 A1 * | 9/2001 | Miyabayashi | 523/161 |
| 2003/0153649 A1 * | 8/2003 | Bromberg | 523/160 |
| 2003/0195275 A1 * | 10/2003 | Sanada et al. | 523/160 |
| 2004/0252169 A1 * | 12/2004 | Chen et al. | 347/96 |

FOREIGN PATENT DOCUMENTS

| | | |
|---|---|---|
| EP | 1153992 A1 | 11/2001 |
| EP | 1 426 422 A | 6/2004 |
| EP | 1 486 541 A | 12/2004 |
| HU | 223659 B1 | 6/2001 |
| WO | 98/30749 | 7/1998 |
| WO | 01/51571 A2 | 7/2001 |

OTHER PUBLICATIONS

Hungarian Patent Office Novelty Search Report for HU Application No. P0700320, Jan. 30, 2009, 4 pages.

* cited by examiner

*Primary Examiner*—Manish S Shah

(57) ABSTRACT

A printing system for use in inkjet printing. The printing system includes an inkjet ink having a free binder, an additional free binder, and a chemically modified pigment, a fixer fluid and a porous print medium.

23 Claims, No Drawings

INKJET INKS PROVIDING IMPROVED WET SMUDGE ON POROUS PRINT MEDIA

CROSS REFERENCE TO RELATED APPLICATION

This application claims the benefit of U.S. provisional patent application Ser. No. 60/615,129 filed Oct. 1, 2004.

FIELD OF THE INVENTION

The present invention relates to an inkjet ink that provides printed images having improved durability. More specifically, the present invention relates to an inkjet ink providing improved durability when printed on a porous print medium.

BACKGROUND OF THE INVENTION

Inkjet inks typically include a pigment or a dye as a colorant in an ink vehicle, such as an aqueous ink vehicle. The decision of whether to use a dye or a pigment in the inkjet ink depends on the particular printing application because each of the colorants provides specific advantages and disadvantages. Dyes are usually water soluble, which makes formulating dye-based inkjet inks relatively easy. However, images printed with the dye-based inkjet inks commonly smear or rub when contacted or exposed to water or moisture. Images printed with dye-based inkjet inks also are not stable to visible light, ultraviolet light, or sunlight. In contrast, pigment-based inkjet inks produce printed images that are more waterfast and lightfast than those produced with dye-based inkjet inks. However, the pigment does not penetrate into the print medium and remains on its surface. Therefore, the printed image has a low resistance to wet smudge and a low highlighter resistance. In addition, achieving and maintaining a uniform dispersion of the pigment is difficult because the pigment is not readily soluble in the ink vehicle. To stably disperse the pigment, dispersing agents, such as polymeric dispersants or surfactants, have been added to the inkjet ink. In addition, surfactants have been adsorbed or coated onto the pigment to improve dispersibility. However, adding polymeric dispersants or surfactants increases the viscosity and affects the printability of the inkjet ink. Furthermore, these pigment-based inkjet inks do not produce durable images when printed on a porous print medium.

To improve the dispersibility of the pigment in the ink vehicle, chemical modifications to the pigments have also been suggested. Pigments have been chemically modified by attaching an organic functional group, such as a small molecule or a polymer, to a surface of the pigment. One problem with inkjet inks including modified pigments, particularly inkjet inks having small molecules attached to their surfaces, is that they do not produce durable images when printed on porous print media. Therefore, to provide increased durability on these print media, polymeric additives have been used in the inkjet ink. However, use of these polymeric additives produce an increase in the viscosity of the inkjet ink, which decreases its printability, optical density ("OD") and resistance to wet smudge.

It would be desirable to provide a pigment-based inkjet ink that exhibits improved wet smudge durability without decreasing OD when printed on a porous print medium.

BRIEF SUMMARY OF THE INVENTION

The present invention relates to a printing system for use in inkjet printing. The printing system comprises an inkjet ink having a free binder and a modified pigment, a fixer fluid, and a porous print medium.

The modified pigment in the inkjet ink comprises a polymer having a molecular weight equal to or greater than approximately 4000 attached to a surface of a pigment.

The present invention also relates to a method of producing a printed image having increased resistance to wet smudge. The method comprises providing a porous print medium and applying an inkjet ink to the porous print medium. The inkjet ink comprises a free binder and a modified pigment having a polymer attached to a surface of the pigment, the polymer comprising a molecular weight equal to or greater than approximately 4000.

DETAILED DESCRIPTION OF THE INVENTION

An inkjet ink having a modified pigment and a free binder is used to produce a durable printed image when applied to a porous print medium. As used herein, the term "modified pigment" refers to a pigment having a polymer attached to a surface of the pigment and the term "polymer" refers to a macromolecule having repeating units of a single monomer group, repeating units of multiple monomer groups, or combinations thereof. The term "free binder" refers to a polymer that is present in the inkjet ink but is not attached to the pigment. A fixer fluid may be used with the inkjet ink to provide the durable printed image, which exhibits no decrease in OD, an improved resistance to wet smudge, and a fast drying time.

The pigment used in the modified pigment may be a conventional pigment used in inkjet inks, such as a black pigment or a colored pigment. Pigments are known in the art and, as such, may be selected for use in the present invention by one of ordinary skill in the art. While the Examples herein describe using black pigments, it is understood that colored pigments may also be used in the present invention. Examples of black pigments include carbon products, such as carbon black, graphite, vitreous carbon, carbon fibers, activated charcoal, and activated carbon. The carbon black may include, but is not limited to, a channel black, a furnace black, and a lamp black pigment. The colored pigments may be polymeric or organic pigments and may include blue, black, white, brown, cyan, green, violet, magenta, red, or yellow pigments, or mixtures thereof. Examples of classes of colored pigments that may be used in the present invention include, but are not limited to, anthraquinones, phthalocyanine blues, phthalocyanine greens, diazos, monoazos, pyranthrones, perylenes, heterocyclic yellows, quinacridones, and (thio)indigoids.

The polymer attached to the pigment may be a thermoplastic or a thermosetting polymer. The polymer may include any type of polymer, such as a random polymer, alternating polymer, graft polymer, block polymer, star-like polymer, and/or comb-like polymer. The polymer may be a homopolymer, copolymer, terpolymer, and/or a polymer having any number of different repeating monomer units. The polymer also may include ionic or ionizable groups, such as an anionic (or acidic) group or a cationic (or basic) group. For instance, the ionic or ionizable group may be a carboxylic acid group or an imine group. While the Examples herein describe modified pigments having one type of polymer attached to the pigment surface, it is understood that more than one type of polymer may be attached to the pigment surface.

The polymer attached to the pigment may be water soluble and may have a molecular weight equal to or greater than approximately 4000. As used herein, the term "molecular weight" refers to a weight average molecular weight and may be determined by gel permeation chromatography in tetrahydrofuran as a solvent. The polymer may have a molecular weight ranging from approximately 4000 to approximately 17500. The polymer attached to the pigment may have a random molecular weight distribution.

Examples of cationic polymers that may be attached to the pigment include, but are not limited to, polyethyleneimines ("PEI"); polyguanides; styrene maleic anhydride imides, commercially available as SMA® imides from Sartomer Co. Inc. (Exton, Pa.); quaternary ammonium compounds, such as polyquaternium compounds commercially available from Sigma-Aldrich Co. (St. Louis, Mo.); and combinations thereof. The polyquaternium compounds include, but are not limited to, polyquaternium 2, polyquaternium 10, polyquaternium 11, and polyquaternium 46. Modified pigments having cationic polymers attached to their surface are known in the art and are commercially available from numerous sources, such as Cabot Corp. (Billerica, Mass.). In one embodiment, the cationic polymer attached to the pigment is a PEI polymer or a polymer of six, linear repeat units of PEI, which is referred to as PEHA.

Anionic polymers that may be attached to the pigment include, but are not limited to, styrene-acrylic polymers, styrene maleic anhydride polymers, polyurethanes, and combinations thereof. Modified pigments having anionic polymers attached to their surface are known in the art and are commercially available from numerous sources, such as Cabot Corp. (Billerica, Mass.). In one embodiment, the anionic polymer is a styrene-acrylic polymer. The styrene-acrylic polymer may include acrylic acid in a range from approximately 13% to approximately 35%. The ratio of acrylic acid to styrene ranges from approximately 0.20 to approximately 0.80. The polymer may have an acid number greater than approximately 80, such as an acid number ranging from approximately 80 to approximately 220. As used herein, the term "acid number" refers to the weight in mg of potassium hydroxide ("KOH") required to neutralize pendant carboxylate groups in 1 g of polymer. Polymers having these properties are known in the art and may be produced by conventional techniques.

To produce the modified pigment, the polymers may be prepared by conventional methods and attached to the pigment, as known in the art. Methods of attaching the polymers are known in the art. One method of attaching the polymer includes reacting the pigment with a diazonium salt of the polymer that is to be attached. The diazonium salt may be reacted with the pigment in a suitable reaction medium for a sufficient amount of time to attach at least one polymer group to the pigment. The number of polymers attached to the pigment may depend on the reaction conditions used and the reactivity of the diazonium salt.

The modified pigment may be present in the inkjet ink in an amount from approximately 1% by weight ("wt %") to approximately 25 wt % based on the weight of the inkjet ink. In one particular embodiment of the invention, the modified pigment is present in an amount from approximately 3 wt % to approximately 10 wt %.

The inkjet ink may also include a free binder. The free binder may be a polymer that is present in the inkjet ink but is not attached to the pigment. The polymer may have the same charge as the charge on the modified pigment. For instance, if a cationic modified pigment is used in the inkjet ink, the free binder may be a cationic polymer. Conversely, if an anionic modified pigment is used, the free binder may be an anionic polymer. The free binder may be selected from the classes of polymers previously described as attached to the pigment. For instance, the free binder may include, but is not limited to, a PEI, a polyguanide, a styrene maleic anhydride imide polymer, a polyquat, a styrene-acrylic polymer, a styrene maleic anhydride polymer, a polyurethane, and mixtures thereof. Examples of styrene-acrylic polymers that may be used as the free binder include, but are not limited to, Joncryl® 678, Joncryl® 586, and Joncryl® 671, which are commercially available from Johnson Polymer, Inc. (Sturtevant, Wis.). Examples of PEI polymers that may be used as the free binder include, but are not limited to, NBZ2458-9 from Avecia Ltd. (Wilmington, Del.) and NiccaJet 100 from Nicca USA, Inc. (Fountain Inn, S.C.). The free binder may have the same charge as the charge on the modified pigment.

In one embodiment, the free binder includes a mixture of polymers, with each of the polymers having the same charge. The free binder may include at least two polymers having a molecular weight ratio ranging from approximately 0.001 to approximately 10. In one particular embodiment, the free binders have a molecular weight ratio ranging from approximately 1 to approximately 10. The two polymers may have similar molecular weights or different molecular weights. For instance, one of the polymers may have a lower molecular weight compared to the molecular weight of the second polymer. For sake of example only, a first polymer may have a molecular weight of approximately 4600 while a second polymer may have a molecular weight of approximately 17250. The first polymer may be present in the inkjet ink at a higher amount compared to the amount of the second polymer that is present. For instance, the first polymer may be present in the inkjet ink at approximately 10 parts while the second polymer may be present at approximately 1 part, providing a molecular weight ratio of 10.

The inkjet ink may be formulated by any technique known in the art. For instance, the modified pigment may be dissolved, dispersed, or suspended in the ink vehicle. In addition to water, the ink vehicle may include water-soluble or water-miscible organic solvents, as known in the art. The inkjet ink may also include additives, such as surfactants, corrosion inhibitors, buffer, antioxidants, and/or biocides. These additives are known in the art and may be selected depending on the desired properties of the inkjet ink. The modified pigment, the additives, and any other ingredients may be mixed, stirred, or otherwise agitated to form the inkjet ink. The pH of the inkjet ink may range from approximately 8 to approximately 10.

The print medium upon which the inkjet ink is deposited may be a porous print medium. Porous print media are known in the art and typically include a porous coating applied to a substrate. The porous print medium may include, but is not limited to, Hammermill® Bond paper, produced by International Paper Co. (Stamford, Conn.); HP Bond and HP Bright White papers, produced by Hewlett-Packard Inc. (Palo Alto, Calif.); Gilbert Bond paper, produced by Gilbert Paper (Appleton, Wis.); Great White® paper, produced by Union Camp; and Sabah Forest Industries Plain Paper Copier paper, produced by Sabah Forest Industries Sdn Bhd (Malaysia). Additional porous print media that may be used in the present invention are available from International Paper Co., StoraEnso (Finland), and Yamayuri.

The inkjet ink may be deposited on the print medium by a conventional inkjet printing technique. For instance, the inkjet ink may be deposited by an inkjet printer, such as an HP DeskJet printer, available from Hewlett-Packard, Inc. (Palo Alto, Calif.). The inkjet ink may be deposited on the print medium, in combination with the fixer fluid, to produce the printed images having an increased resistance to wet smudge. In addition, the inkjet ink has a low viscosity, improved printability, and a fast drytime, such as less than five seconds. A heater may not be necessary to provide the printed images.

To immobilize the modified pigment and provide an increased resistance to wet smudge, the fixer fluid may be applied to the print medium. The fixer fluid may include a vehicle and a polymer that reacts with the inkjet ink. The reactive polymer may have a charge opposite to the charge of the modified pigment. For instance, if the modified pigment is anionic, the fixer fluid may include a cationic, reactive polymer. The cationic reactive polymer may include, but is not limited to, a PEI, a water-dispersed alkoxylated form of PEI, and poly diallyl dimethyl ammonium chloride. In addition, the fixer fluid may be substantially devoid of a colorant or may include a colorant that does not absorb visible light.

The fixer fluid may also include a precipitating agent, such as a salt or an acid. The salt may include cations, such as calcium, magnesium, aluminum, or combinations thereof. The salt may include, but is not limited to, calcium nitrate, magnesium nitrate, or ammonium nitrate. The acid may be any mineral acid or an organic acid, such as succinic acid or glutaric acid. The precipitating agent may be used to change the conductivity or the pH of the inkjet ink, causing the modified pigment to precipitate on the surface of the print medium. The fixer fluid may be over-printed or under-printed on the print medium relative to the inkjet ink. As such, the fixer fluid may be present in an additional pen in the inkjet printer, such as a fifth pen.

The fixer fluid may also include a dye having a charge opposite to the charge on the pigment. The charged dye may be used to precipitate the modified pigment on the print medium. For instance, the fixer fluid may include an anionic dye if the modified pigment is cationic. Alternatively, the fixer fluid may have a cationic dye if the modified pigment is anionic. In one embodiment, the dye is an anionic, cyan dye.

Without being tied to a particular theory, it is believed that when the inkjet ink is applied to the print medium, the polymers in the free binder form a matrix that bridges gaps between the pigments and voids on the surface of the print medium. Depositing the fixer fluid on the print medium provides interactions between the surface of the print medium, the modified pigment, and the free binder, immobilizing the modified pigment on the print medium. The fixer fluid forms a coating on the print medium that provides a chemically modified surface that is capable of providing kinetically and thermodynamically favorable interactions between the print medium, the modified pigment, and the free binder. Since the charge on the reactive polymer in the, fixer fluid is opposite to the charge of the modified pigment, the modified pigment and the matrix are immobilized on the print medium. The present invention will be further clarified by the following examples, which are included to explain various embodiments-of the present invention. These examples are intended to be illustrative and are not intended to limit the scope of the present invention. As such, these examples are not to be construed as being exhaustive or exclusive as to the scope of this invention.

EXAMPLES

Example 1

Inkjet Inks Using Modified Pigments and Free Binders

Inkjet ink formulations A-D having the ingredients shown in Table 1 were produced. The fixer fluid having the ingredients shown in formulation E was also produced. The fixer fluid also included acid blue 9.

TABLE 1

Formulations of InkJet Inks and Fixer Fluid.

| Ingredient | Formulation | | | | |
| --- | --- | --- | --- | --- | --- |
| | A | B | C | D | E |
| Cabot IJX 489 Black Pigment | 3.00% | 3.00% | 4.00% | 4.00% | |
| Joncryl ® 586 resin | 1.50% | 1.50% | 1.50% | 2.50% | |
| Joncryl ® 671 resin | | 0.15% | 0.15% | 0.25% | |
| Zonyl FSO | 0.20% | 0.20% | 0.20% | 0.20% | 0.20% |
| 2-pyrrolidone | 7.00% | 7.00% | 7.00% | 7.00% | 7.00% |
| 1,2-hexanediol | 4.00% | 4.00% | 4.00% | 4.00% | 4.00% |
| Liponics EG-1 | 1.50% | 1.50% | 1.50% | 1.50% | |
| Succinic acid | | | | | 4.00% |
| Water | balance | balance | balance | balance | balance |

Cabot IXJ 489 was obtained from Cabot Corp. (Billerica, Mass.) Cabot IJX 489 has a stryene-acrylic polymer with a molecular weight of 800 and an acid number of 165 attached to Black Pearls® as a base pigment.

The inkjet inks and fixer fluid were formulated by conventional techniques. Physical properties of Formulations A-D were measured as known in the art and are shown in Table 2.

TABLE 2

Physical Properties of Formulations A-D.

| | Formulation | | | |
| --- | --- | --- | --- | --- |
| | A | B | C | D |
| Surface Tension (dynes/cm) | 21.22 | 21.2 | 21.71 | 23.69 |
| Viscosity (cps) | 2.63 | 2.49 | 3.09 | 3.27 |

Example 2

Durability Performance of Formulations A-D

Images were printed on HP Bright White paper with the inkjet ink formulations described in Example 1. The fixer fluid of formulation E was underprinted relative to the printed image. The OD of the printed images was then determined. OD was measured with a MacBeth densitometer, available from Amazys Holding AG (formerly GretagMacbeth Holding AG).

In addition, wet smudge tests were performed. Wet smudge is the ability of the printed image to resist smearing after the inkjet ink is printed on the print medium, dried, and then rubbed in the presence of water. To determine the wet smudge performance, water was dripped across the printed image. The printed image was then rubbed with a finger covered by a finger cot. The resistance to smudging was quantitatively measured by the MacBeth densitometer in OD units.

Results for the OD and wet smudge tests are shown in Table 3.

TABLE 3

Durability Performance on HP Bright White Print Medium.

|  | Formulation | | | |
| --- | --- | --- | --- | --- |
|  | A | B | C | D |
| Optical Density | 1.53 | 1.5 | 1.59 | 1.49 |
| Wet Smudge | 0.21 | 0.11 | 0.26 | 0.17 |

As shown in Table 3, formulations A-D were resistant to wet smudge. A comparison of formulation A, which included one polymer as the free binder, and formulation B, which included two polymers as the free binder, shows that the latter had increased resistance to wet smudge and comparable OD. When the pigment concentration was increased to 4.00%, as in formulation C, the OD and resistance to wet smudge decreased. However, increasing the amount of free binder, as in formulation D, provided increased resistance to wet smudge and comparable OD.

Example 3

Inkjet Inks Using Modified Pigments Having Lower Molecular Weight Polymers

Inkjet ink formulations F, G, and H having the ingredients shown in Table 4 were produced.

TABLE 4

Inkjet Ink Formulations F, G, and H.

|  | Formulation | | |
| --- | --- | --- | --- |
| Ingredient | F | G | H |
| Cabot IJX 306B Black Pigment | 4.00% | 4.00% | 4.00% |
| NBZ2458-9 |  | 2.00% |  |
| NiccaJet100 |  |  | 2.00% |
| 2-pyrrolidone | 4.00% | 4.00% | 4.00% |
| 1,2,6-hexanetriol | 6.00% | 6.00% | 6.00% |
| Liponics EG-1 | 6.00% | 6.00% | 6.00% |
| Glycerol | 4.00% | 4.00% | 4.00% |
| Water | balance | balance | balance |

The modified pigment used in the formulations was Cabot IJX 306B, which was obtained from Cabot Corp. (Billerica, Mass.). This modified pigment product had polymers having molecular weights less than approximately 4000 attached to Black Pearls® as the base pigment. In Cabot IJX 306B, a PEHA polymer having a molecular weight of 600 was attached to the base pigment. Formulations G and H also included NBZ2458-9 or NiccaJet 100 as free binders.

The inkjet inks were formulated by conventional techniques.

Example 4

Durability Performance of Formulations F-H

The inkjet ink formulations described in Example 3 were printed on HP Bright White media. Each of the inkjet ink formulations was printed by itself and also with underprinting of the fixer fluid. OD and wet smudge tests were performed on each of the formulations, as previous described. Results for these tests are shown in Tables 5-6.

TABLE 5

Durability Performance of Formulations F-H on HP Bright White Print Medium.

|  | Formulation | | |
| --- | --- | --- | --- |
|  | F | G | H |
| Optical Density | 1.53 | 1.57 | 1.57 |
| Wet Smudge | 0.48 | 0.23 | 0.28 |

TABLE 6

Durability Performance of Formulations F-H on HP Bright White Print Medium with Cyan Underprinting.

|  | Formulation | | |
| --- | --- | --- | --- |
|  | F | G | H |
| Optical Density | 1.48 | 1.53 | 1.53 |
| Wet Smudge | 0.24 | 0.04 | 0.10 |

On HP Bright White print media, the resistance to wet increased when the fixer fluid was applied compared to printing with the inkjet ink formulation alone. In addition, the OD of the printed images was at least comparable when the fixer fluid was applied.

What is claimed is:

1. A printing system providing increased resistance to wet smudge, comprising:
   an inkjet ink comprising a first free binder, an additional free binder and a chemically modified pigment, the chemically modified pigment comprising a polymer having a molecular weight equal to or greater than approximately 4000 chemically attached to a surface of a pigment, a charge on the first free binder and the additional free binder being the same as a charge on the polymer of the chemically modified pigment, and a molecular weight ratio of the free binder and the additional free binder ranging from approximately 0.001 to approximately 10;
   a fixer fluid; and
   a porous print medium having a surface that is modified by the fixer fluid.

2. The printing system of claim 1, wherein the free binder comprises a polymer selected from the group consisting of a polyethyleneimine, a polyguanide, a styrene maleic anhydride imide, a quaternary ammonium compound, and mixtures thereof.

3. The printing system of claim 1, wherein the polymer attached to the surface of the pigment has a molecular weight equal to or greater than approximately 5000.

4. The printing system 1, wherein the polymer attached to the surface of the pigment has a molecular weight ranging from approximately 4000 to approximately 17500.

5. The printing system of claim 1, wherein the additional free binder comprises a polymer selected from the group consisting of a polyethyleneimine, a polyguanide, a styrene maleic anhydride imide, a quaternary ammonium compound, and mixtures thereof.

6. The printing system of claim 1, wherein the additional free binder comprises a polymer selected from the group consisting of a styrene-acrylic polymer, a styrene maleic anhydride polymer, a polyurethane, and mixtures thereof.

7. The printing system of claim 1, wherein the fixer fluid comprises a reactive polymer in a vehicle, the reactive polymer having a charge opposite to a charge on the polymer of the chemically modified pigment.

8. The printing system of claim 1, wherein a molecular weight ratio of the free binder and the additional free binder ranges from approximately 1 to approximately 10.

9. The printing system of claim 1, wherein the free binder has a lower molecular weight than the additional free binder.

10. The printing system of claim 1, wherein the free binder has a molecular weight of approximately 4600 and the additional free binder has a molecular weight of approximately 17250.

11. A method of producing a printed image having increased resistance to wet smudge, comprising:
providing a porous print medium;
applying an inkjet ink to the porous print medium, the inkjet ink comprising a first free binder, an additional free binder, and a chemically modified pigment having a polymer chemically attached to a surface of the pigment, the polymer having a molecular weight equal to or greater than approximately 4000 and a molecular weight ratio of the free binder and the additional free binder ranging from approximately 0.001 to approximately 10; and
applying a fixer fluid to the porous print medium to modify a surface of the porous print medium.

12. The method of claim 11, wherein applying the inkjet ink to the porous print medium comprises applying an inkjet ink comprising the polymer of the chemically modified pigment selected from the group consisting of a polyethyleneimine, a polyguanide, a styrene maleic anhydride imide, a quaternary ammonium compound, and mixtures thereof to the porous print medium.

13. The method of claim 11, wherein applying the inkjet ink to the porous print medium comprises applying an inkjet ink comprising the chemically modified pigment with a polymer having a molecular weight equal to or greater than approximately 5000.

14. The method of claim 11, wherein applying the inkjet ink to the porous print medium comprises applying an inkjet ink comprising the chemically modified pigment with a polymer having a molecular weight ranging from approximately 4000 to approximately 17500.

15. The method of claim 11, wherein applying the fixer fluid to the porous print medium comprises underprinting the fixer fluid relative to the inkjet ink.

16. The method of claim 11, wherein applying the fixer fluid to the porous print medium comprises overprinting the fixer fluid relative to the inkjet ink.

17. The method of claim 11, wherein using the additional free binder in the inkjet ink comprises using a polymer selected from the group consisting of a polyethyleneimine, a polyguanide, a styrene maleic anhydride imide, a quaternary ammonium compound, and mixtures thereof.

18. The method of claim 11, wherein using the additional free binder in the inkjet ink comprises using a polymer selected from the group consisting of a styrene-acrylic polymer, a styrene maleic anhydride polymer, a polyurethane, and mixtures thereof.

19. The method of claim 11, wherein the fixer fluid comprises a reactive polymer in a vehicle, the reactive polymer having a charge opposite to a charge on the polymer of the chemically modified pigment.

20. The method of claim 11, wherein a molecular weight ratio of the free binder and the additional free binder ranges from approximately 1 to approximately 10.

21. The method of claim 11, wherein the free binder has a lower molecular weight than the additional free binder.

22. The method of claim 11, wherein the free binder has a molecular weight of approximately 4600 and the additional free binder has a molecular weight of approximately 17250.

23. The method of claim 11, wherein a charge on the free binder and the additional free binder is the same as a charge on the polymer of the chemically modified pigment.

* * * * *

UNITED STATES PATENT AND TRADEMARK OFFICE
CERTIFICATE OF CORRECTION

| | | |
|---|---|---|
| PATENT NO. | : 7,677,714 B2 | Page 1 of 1 |
| APPLICATION NO. | : 11/070897 | |
| DATED | : March 16, 2010 | |
| INVENTOR(S) | : George Sarkisian et al. | |

It is certified that error appears in the above-identified patent and that said Letters Patent is hereby corrected as shown below:

In column 3, line 9, delete "polyguanides;" and insert -- polyguanidines; --, therefor.

In column 4, line 2, delete "polyguanide," and insert -- polyguanidine, --, therefor.

In column 8, line 48, in Claim 2, delete "polyguanide," and insert -- polyguanidine, --, therefor.

In column 8, line 54, in Claim 4, after "system" insert -- of claim --.

In column 8, line 59, in Claim 5, delete "polyguanide," and insert -- polyguanidine, --, therefor.

In column 9, line 30, in Claim 12, delete "polyguanide," and insert -- polyguanidine, --, therefor.

In column 10, line 15, in Claim 17, delete "polyguanide," and insert -- polyguanidine, --, therefor.

Signed and Sealed this
Seventeenth Day of May, 2011

David J. Kappos
*Director of the United States Patent and Trademark Office*